April 26, 1938.          C. H. EHLERS          2,115,016
                         FILLING DEVICE
                       Filed April 17, 1934
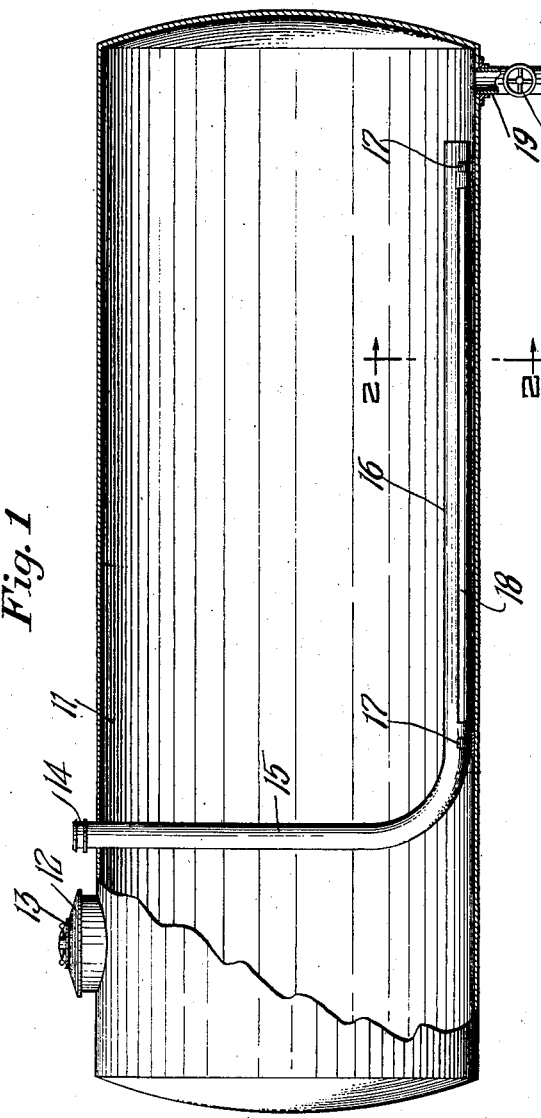
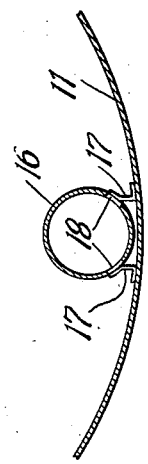
Inventor
Carl H. Ehlers
By his Attorney Patented Apr. 26, 1938

2,115,016

UNITED STATES PATENT OFFICE 2,115,016

FILLING DEVICE

Carl H. Ehlers, Penfield, Pa., assignor to The Atlantic Refining Company, Philadelphia, Pa., a corporation of Pennsylvania Application April 17, 1934, Serial No. 720,956

3 Claims. (Cl. 220—86)

This invention relates to improvements in liquid containers and more especially to filling devices for tanks such as are used for the transportation and delivery of liquids, particularly liquid petroleum products.

Heretofore, it has been customary to fill such tanks either by discharging the liquid directly into the top of the tank or by conducting the liquid to a point near the bottom of the tank by means of a fill pipe having its discharge end arranged adjacent the bottom of the tank. Substantial frothing or foaming results from filling the tanks in this manner, with incident difficulty in loading and gauging.

An object of this invention is to provide a filling device, by the use of which such tanks may be filled with liquid without incident formation of froth and foam.

According to this invention, frothing and foaming during filling of the tank is avoided by introducing the liquid into the tank through a pipe having a substantially horizontal section arranged adjacent the bottom of the tank and extending at least partially the length of the tank. The horizontally disposed section of the fill pipe is provided with one or more slots or apertures which have a total discharge area greater than the cross-sectional area of the fill pipe itself, whereby liquid in passing from the fill pipe into the tank is reduced in velocity to such extent that churning and swirling of the liquid with consequent entrainment of air to form froth is prevented.

Other objects, novel features and advantages of this invention will become apparent from the following specification and accompanying drawing, wherein.

Fig. 1 is a side elevation partially broken away of a tank equipped with a fill pipe embodying the invention;

Fig. 2 is an enlarged section on the line 2—2 of Fig. 1, and

Fig. 3 is a similar section of a modified embodiment.

Referring now to Figs. 1 and 2, 11 is a tank of the type adapted to be mounted, for example, on a truck. The tank is provided with a dome 12 to facilitate inspection and gauging, the dome being provided with a removable cover 13. Liquid is charged into the tank 11 through a fill pipe 14, consisting of a section 15, preferably vertical, extending nearly to the bottom of the tank 11 and a substantially horizontal section 16 extending along the bottom of the tank. The section 16 is of substantial length and preferably extends approximately three-fourths of the tank length. Clips 17 are provided for supporting the section 16, these clips being fastened rigidly to the tank 11. The horizontal section is provided with one or more longitudinal discharge slots or apertures, these apertures having such dimensions as to be of greater area than the cross-sectional area of the fill pipe. At the end of the tank is arranged a drain pipe 19 controlled by a valve 20.

The liquid with which the tank is to be filled is supplied to the upper end of the fill pipe 14, by means of a suitable supply line (not shown) and the liquid is discharged into the tank through the apertures 18. The velocity of the liquid passing through the apertures 18 is substantially reduced by reason of the relatively large area thereof and the liquid is thus introduced into the tank adjacent the bottom thereof without splashing or other agitation commonly encountered in tanks equipped with types of fill pipes heretofore in use.

Frothing and foaming is avoided and filling of the tank and gauging its contents are expedited.

In the modification disclosed in Fig. 3, a semicircular bent plate 21 is attached to or formed integral with the section 15 in any suitable manner and is disposed substantially horizontally along the tank bottom. The plate 21 is supported by the clips 22 and is provided with a discharge aperture which is of substantially greater area than the cross-section of the pipe 15. In this modification also, liquid is introduced into the tank at reduced velocity without splashing or agitation, and foaming and frothing is avoided.

It is of course apparent that various modifications may be made in the device above described, without in any way departing from the spirit and scope of the invention as defined in the appended claims.

I claim:

1. In combination with an elongated tank for transporting liquids, a fill pipe having a substantially vertical section extending substantially to the bottom of the tank, and a substantially horizontal section extending from the lower end of said vertical section adjacent to and for a major portion of the length of the bottom of the tank, said horizontal section having a discharge slot facing the bottom of the tank and extending throughout the major portion thereof, said slot being of greater area than the cross-sectional area of the fill pipe, and said fill pipe being of substantially uniform diameter throughout.

2. In combination with an elongated tank for transporting liquids, a fill pipe having a substantially vertical section extending substantially to the bottom of the tank and a substantially horizontal section extending from the lower end of said vertical section adjacent to and for a major portion of the length of the bottom of the tank, said horizontal section having a discharge slot facing the bottom of the tank and extending throughout the major portion thereof, said slot being of sufficiently greater area than the cross-sectional area of the fill pipe that the velocity of liquid passing therethrough into the tank is substantially reduced, and said fill pipe being of substantially uniform diameter throughout.

3. In combination with an elongated tank for transporting liquids, a substantially vertical fill pipe extending substantially to the bottom of the tank and an extension thereof comprising a semi-circularly bent plate arranged adjacent to the lower end of said vertical fill pipe, and extending substantially horizontally over a major portion of the length of the bottom of the tank, one side of said bent plate forming an opening facing the bottom of the tank and extending throughout the major portion of the length thereof to form a discharge area for the liquid passed into said fill pipe of greater cross-sectional area than the cross-sectional area of the fill pipe itself, the fill pipe and its extension being of substantially uniform diameter throughout.

CARL H. EHLERS.